United States Patent
Tassinari et al.

(10) Patent No.: US 6,880,577 B2
(45) Date of Patent: Apr. 19, 2005

(54) REED VALVE ASSEMBLY

(76) Inventors: Steven M. Tassinari, 79 Chellis Rd. Box 292, Meridan, NH (US) 03770; Scott A. Tassinari, 274 New Boston Rd., Norwich, VT (US) 05055

( * ) Notice: Subject to any disclaimer, the term of this patent is extended or adjusted under 35 U.S.C. 154(b) by 0 days.

(21) Appl. No.: 10/142,509

(22) Filed: May 10, 2002

(65) Prior Publication Data

US 2003/0209275 A1 Nov. 13, 2003

(51) Int. Cl.[7] ............................................. F16K 15/16
(52) U.S. Cl. ................. 137/855; 137/454.4; 137/512.1; 123/73 V
(58) Field of Search .................. 417/566; 137/315.16, 137/315.33, 512.1, 855, 856, 857, 858, 454.2, 454.4; 251/357; 123/73 V

(56) References Cited

U.S. PATENT DOCUMENTS

| | | | | |
|---|---|---|---|---|
| 1,375,252 A | * | 4/1921 | Huff ........................... | 137/454.4 |
| 2,199,307 A | * | 4/1940 | Eichelberg ................ | 137/454.4 |
| 2,505,757 A | * | 5/1950 | Dunbar et al. ............. | 137/512.1 |
| 2,781,777 A | * | 2/1957 | Oxnam ........................ | 137/856 |
| 3,128,785 A | * | 4/1964 | Krummel .................. | 137/315.33 |
| 3,139,108 A | * | 6/1964 | Klingman .................. | 137/512.1 |
| 3,981,276 A | * | 9/1976 | Ernest ......................... | 123/242 |
| 4,179,051 A | * | 12/1979 | Thomas ....................... | 222/494 |
| 5,105,731 A | * | 4/1992 | Kraus .......................... | 454/143 |
| 5,245,956 A | * | 9/1993 | Martin ........................ | 123/73 V |
| 5,247,912 A | * | 9/1993 | Boyesen et al. ........... | 123/65 V |
| 5,263,895 A | * | 11/1993 | Kraus et al. ................. | 454/162 |
| 5,373,867 A | * | 12/1994 | Boyesen et al. ............ | 137/514 |
| 5,419,739 A | * | 5/1995 | Lewis ......................... | 454/162 |
| 5,493,474 A | * | 2/1996 | Schkrohowsky et al. .... | 361/695 |
| 5,601,117 A | * | 2/1997 | Lewis et al. ................ | 137/855 |
| 5,636,658 A | * | 6/1997 | Powell ...................... | 137/512.1 |
| 5,759,097 A | * | 6/1998 | Bernoville et al. .......... | 454/162 |
| 5,794,654 A | * | 8/1998 | Marvonek et al. ...... | 137/512.15 |
| 5,823,870 A | * | 10/1998 | Emerling et al. ........... | 454/162 |
| 6,273,127 B1 | * | 8/2001 | Wade ...................... | 137/512.15 |
| 2001/0035222 A1 | * | 11/2001 | Cour ........................... | 137/855 |

FOREIGN PATENT DOCUMENTS

JP          2001-123955    * 5/2001

* cited by examiner

*Primary Examiner*—Ramesh Krishnamurthy
(74) *Attorney, Agent, or Firm*—Devine, Millimet & Branch; Paul C. Remus; Michelle Saquet Temple

(57) ABSTRACT

The reed valve assembly of the present invention includes a reed cage, a retainer, and reed petals. The retainer is independently interlockable with the reed cage. As defined herein, independently interlockable is understood to mean that no additional parts are required to connect the retainer to the reed cage. As implied by the term interlockable, the retainer and reed cage are separable. The reed petals are removably secured to the reed cage. In one embodiment, the reed petals are secured to the reed cage with the retainer.

14 Claims, 6 Drawing Sheets

REED VALVE ASSEMBLY

FIELD OF THE INVENTION

The present invention relates to the field of engine parts. Specifically, the present invention relates to the field of reed valve assemblies. More specifically, the present invention is directed at reed valve assemblies used in 2-stroke motors.

BACKGROUND OF THE PRESENT INVENTION

FIG. 1 is an example of a traditional 2-stroke motor reed valve. The reed valve 10 includes a v-shaped base 12, pliable reed petals 14, and stoppers 16. The base is substantially hollow with a plurality of openings covered by the reed petals 14. In operation, air flows into the center of the base 12 and through the openings in the base 12, pushing the reed petals 14 back towards the stoppers 16. When the air reverses flow, the reed petals 14 press firmly against the base, covering the openings and substantially impeding airflow.

One problem with the traditional 2-stroke motor reed valve is wear and tear on the reed petals 14. A reed petal 14 opens and closes 133 times per second at 8,000 rpm. The fatigue on the reed petals 14 requires regular replacement of the reed petals 14. Therefore a reed valve assembly design is needed that reduces wear on the reed petals 14.

FIG. 2 is an image of a more recent reed valve assembly. The reed valve 20 includes a w-shaped base 22, pliable reed petals 24, guards 26, and an inner stopper 28. The design of this reed valve 20 creates a broader opening for allowing passage of air and improved engine performance. Also the reed petals 24 against the guards 26 are not required to bend as far for the reed valve 20 to allow more airflow than the traditional reed valve 10 because of the volume of airflow allowed past the reed petals 24 against the inner stopper 28. The reduced movement radius of the reed petals 24 reduces wear and tear on the reed petals 24. The reed petals 24 against the guards 26 are held between the guards 26 and the base 22 by screws 30. The reed petals 24 against the inside stopper 28 are held in place by the reed cage in the base 22 and the inside stopper 28. Finally, the reed valve 20 is held in place within the motor by a flange 32, which is attached to the base 22 by screws 30.

The more recently designed reed valve 20 has several problems. One problem is the screws 30 attaching the base 22 to the flange 32 and the base 22 to the guards 26. The screws 30 required are special order screws increasing the cost of assembly. Also, with regular use and repair, such that the screws 30 need to be repeatedly removed and reinserted, the screws 30 and screw holes become stripped. The stripped condition of the screws 30 can result in the screws 30 falling out of the reed valve 20 and into the motor, significantly damaging the motor. Therefore a reed valve assembly is needed that does not contain screws 30 capable of falling into the motor.

Another problem with the reed valve 20 design is assembly time. The number of parts and screws to be assembled with assorted tools runs up the assembly time used to make the reed valve 20. Labor costs cause the reed valve 20 to be unduly expensive. Ideally the reed valve assembly would snap together without the need for any tools.

SUMMARY OF THE INVENTION

The present invention is based on the realization that a reed valve can be designed that assembles quickly and easily without extraneous fastening parts that can slip into the engine. The present invention is designed to have the flange mechanically interlock with the reed valve base and to hold the reed petals in place between the flange and base without any separate fastening parts.

Therefore, it is an object of the present invention to avoid using separate fastening parts to assemble the reed valve.

It is a further object of the present invention to avoid the use of tools to assemble the reed valve.

It is a further object of the present invention to maximize the durability of the reed petals.

It is a further object of the present invention to maximize the desirable airflow through the reed valve.

DETAILED DESCRIPTION OF THE INVENTION

Figure 1:
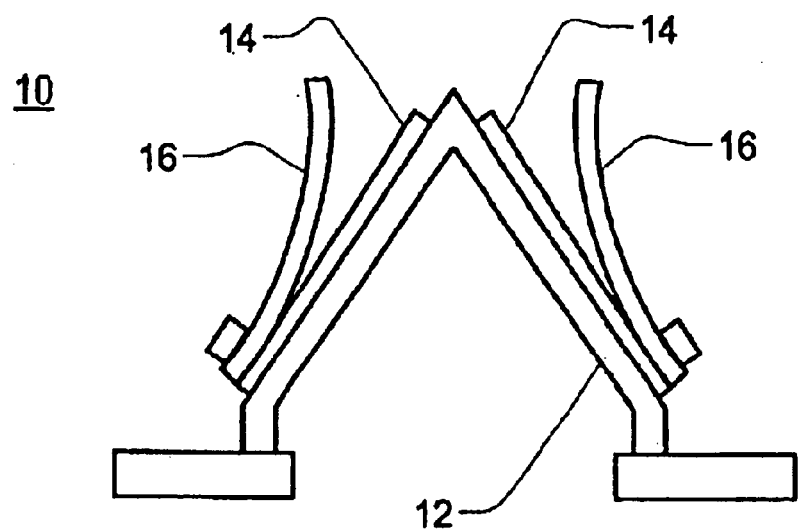
FIG. 1 is a cross-sectional diagram of one reed valve in the prior art.
Figure 2:
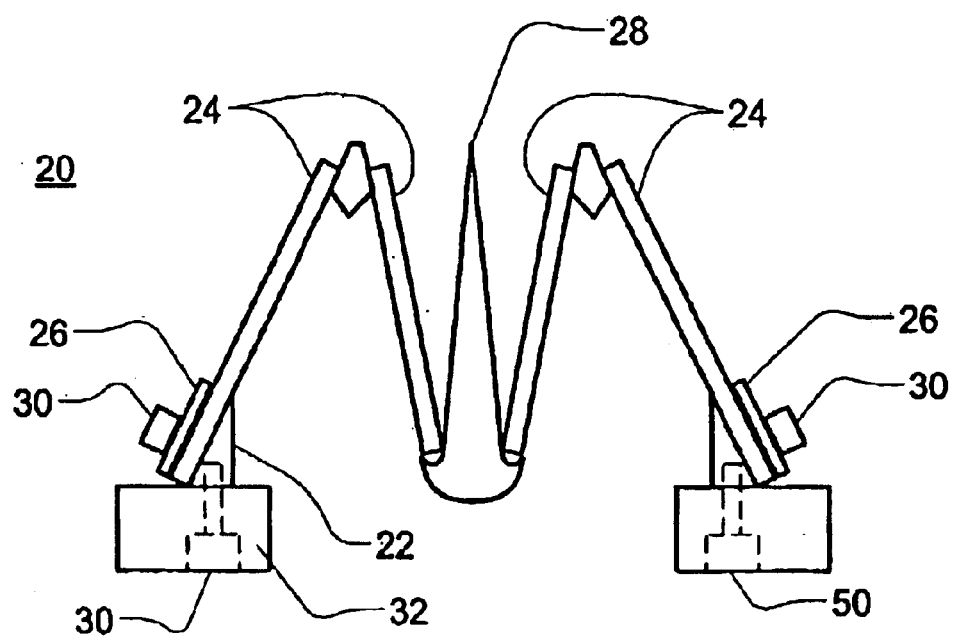
FIG. 2 is a cross-sectional diagram of one recently designed reed valve in the prior art.
Figure 3:
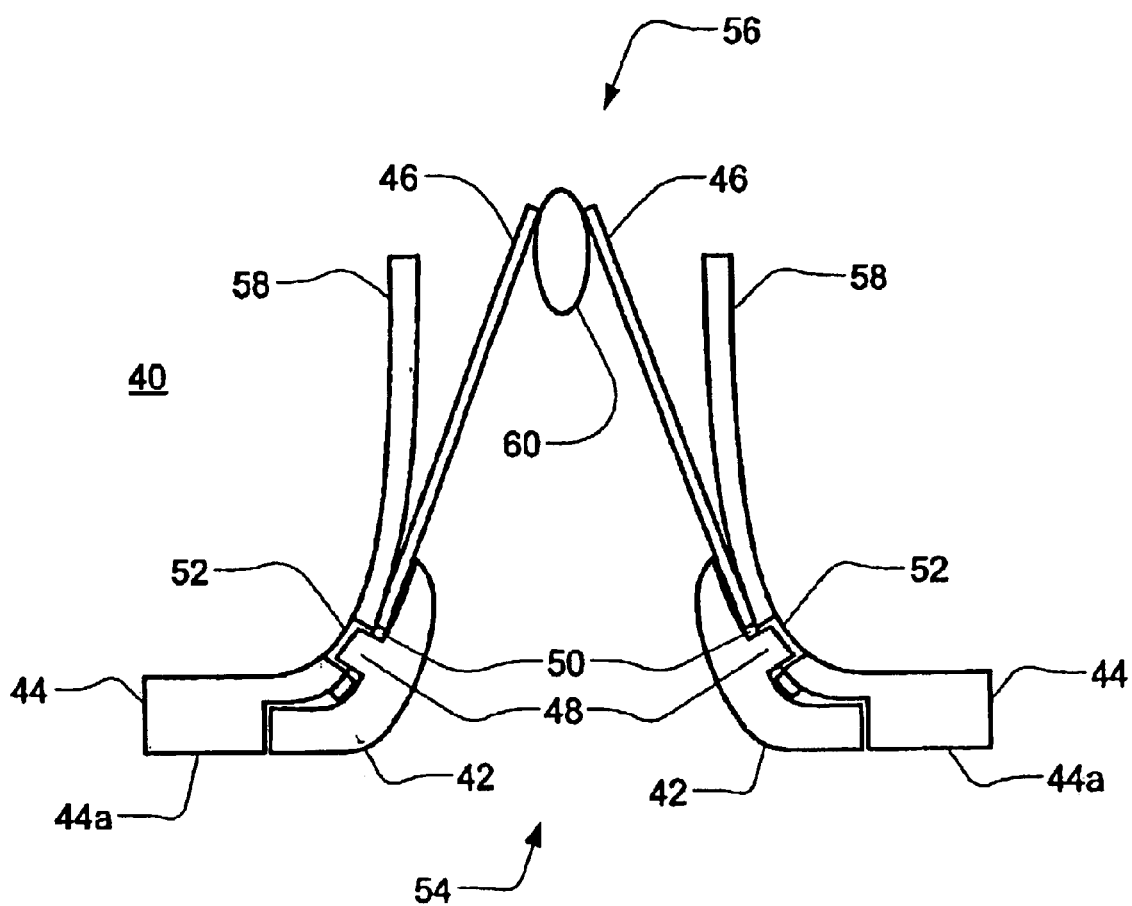
FIG. 3 is a cross-sectional diagram of one embodiment of the present invention.

The reed valve assembly 40 of the present invention, as shown in FIG. 3, includes a reed cage 42, a retainer 44, and reed petals 46. The retainer 44 is independently interlockable with the reed cage 42. As defined herein, independently interlockable is understood to mean that no separate parts are required to connect the retainer 44 to the reed cage 42. As implied by the term interlockable, the retainer 44 and reed cage 42 are separable. The reed petals 46 are removably secured to the reed cage 42.

In one embodiment, the reed petals 46 are secured to the reed cage 42 with the retainer 44. As shown in FIG. 3, the retainer 44 is a flange 44a, one of several possible embodiments for the retainer 44. Tabs 48 are formed in the reed cage 42. The reed petals 46, with holes 50 formed therein, fit over the tabs 48. The flange 44a is slotted 52 to accept the tabs 48, thereby interlocking the retainer 44 to the reed cage 42 and securing the reed petals 46 in place.

Figure 4:
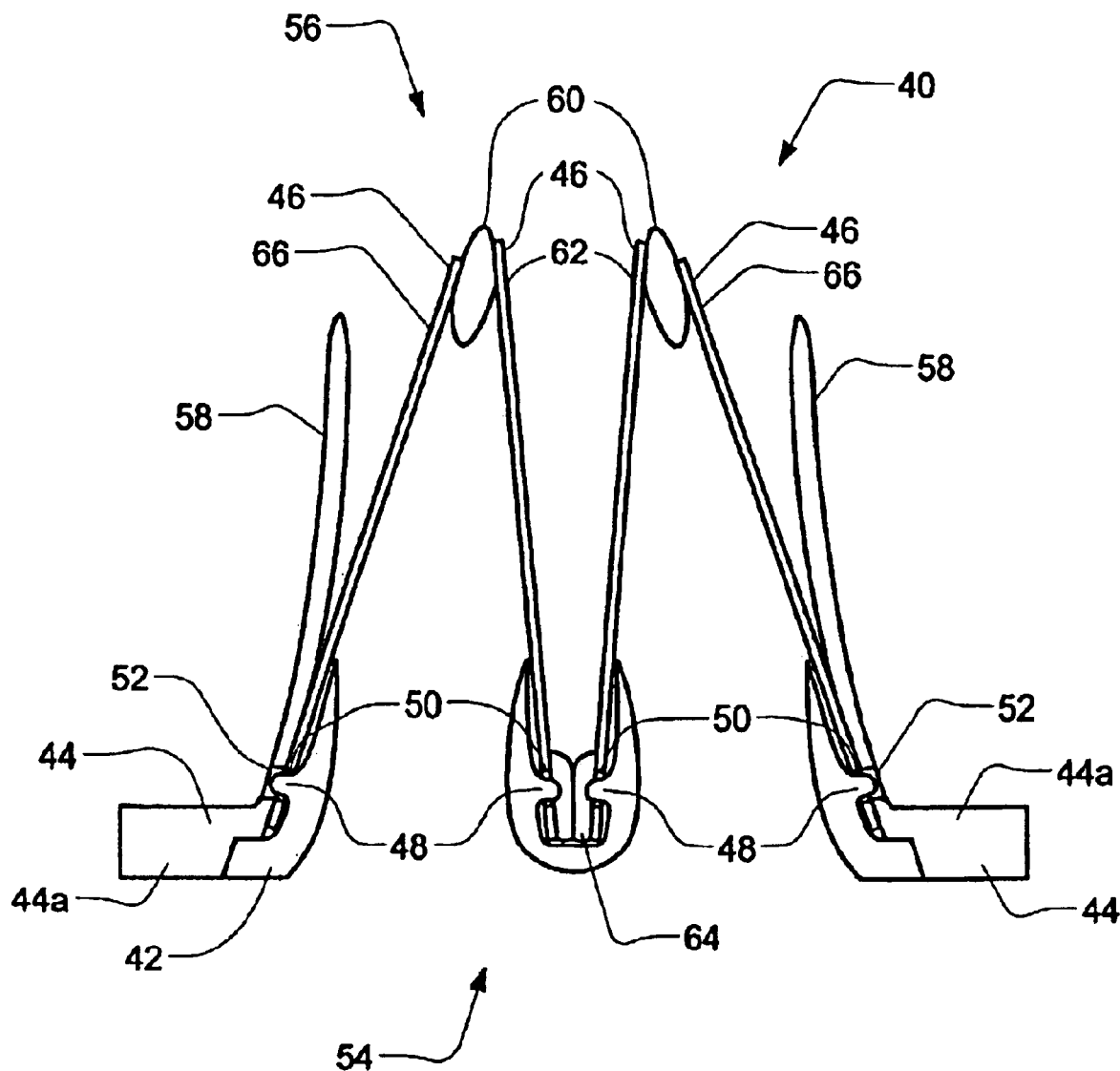
FIG. 4 is a cross-sectional diagram of another embodiment of the present invention.
Figure 5:
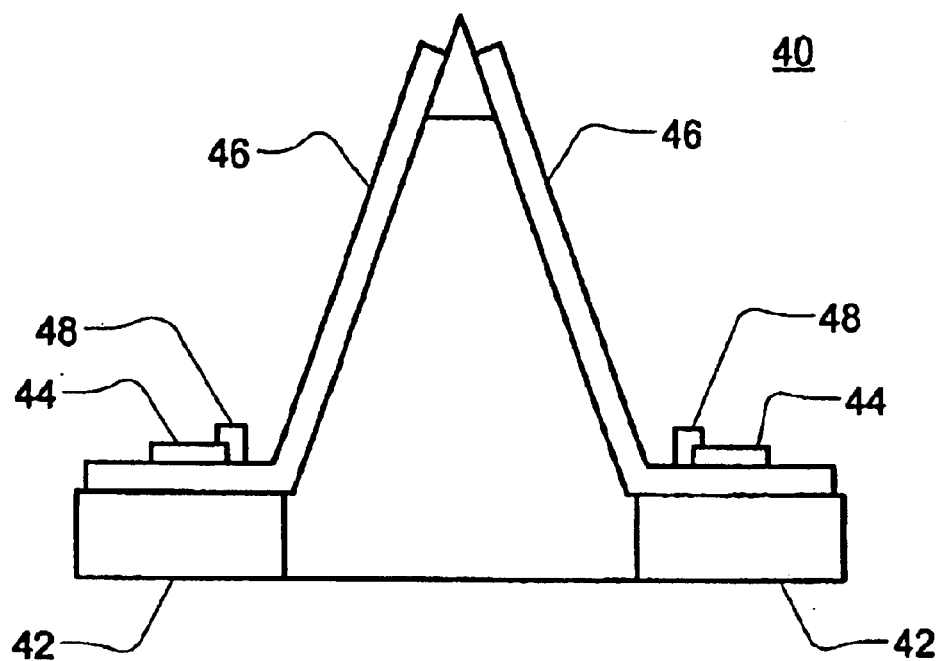
FIG. 5 is a cross-sectional diagram of another embodiment of the present invention.

In one embodiment, as shown in FIG. 4, the reed cage 42 is w-shaped. The reed valve assembly 40 is designed such that the reed petals 46 pivot on the base 54 of the reed cage 42 to open at the tip 56 of the reed cage 42, allowing airflow moving from the base 54 to the tip 56. When the reed petals 46 open, the opening at the tip 56 is approximately as wide as the base 54, as is the case with traditional reed valves 10. The benefit of the reed cage 42 with a w-shape is that none of the reed petals 46 need to pivot as far as reed petals 14 on the traditional reed valves 10 to generate the same size opening at the tip 56. The reduced pivot reduces wear and tear on the reed petals 46 and increases the speed with which the reed petals 46 can react to changes in airflow direction.

This speed is particularly important when the reed petals 46 are opening and closing more than 100 times per second.

In another embodiment, the reed petals 46 are secured at differing heights. The environment surrounding the reed valve assembly 40 is tapered from the base 54 side of the environment to the tip 56 side. The differing heights of the reed petals 46 permits the assembly 40 to conform to the environment. Adding reed stops 58 to the retainer 44, which extend partially up the side of the reed petals 46, but do not extend to the tip 56 would further modify this embodiment of conforming to the environment.

In another embodiment, the reed cage 42 further comprises at least one airfoil tip 60, improving the aerodynamics of the assembly.

In another embodiment, the retainer 44 further comprises at least one reed stop 58. The reed stop 58 is used to keep the reed petals 46 from pivoting too far. The reed stops 58 should extend at least partially perpendicularly from the flange 44 and at least partially up the reed petals 46. The reed stop 58 may be slightly arced to conform to the natural bending of the reed petals 46.

In another embodiment, the reed petals 46 include inner reed petals 62 removably secured to the reed cage 42 by an insert 64 and outer reed petals 66 removably secured to the reed cage 42 with the flange 44a. This embodiment requires the reed cage 42 to be in a w-shape or some other multiple v-shapes (wherein the w-shape is the equivalent of abutting v-shapes). Ideally, the insert 64 independently interlocks with the reed cage 42 to hold the reed petals 46 in place. The only difference between the inner reed petals 62 and outer reed petals 66 in this embodiment is the means of securing. This embodiment is further narrowed wherein the top of the inner reed petals 62 is located above the top of the outer reed petals 66.

One embodiment of the reed valve assembly 40 includes making the retainer 44 manually interlockable with the reed cage 42. Manually interlockable is understood to mean the retainer 44 is interlocked with the reed cage 42 by hand, without the assistance of any tools, such as a screwdriver.

Figure 6:
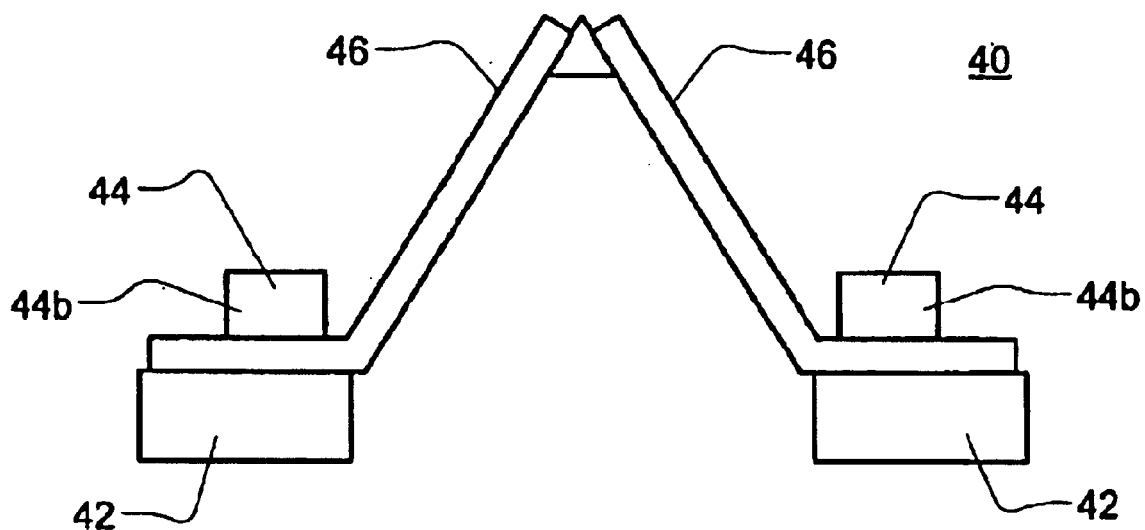
FIG. 6 is a cross-sectional diagram of another embodiment of the present invention.
Figure 7:
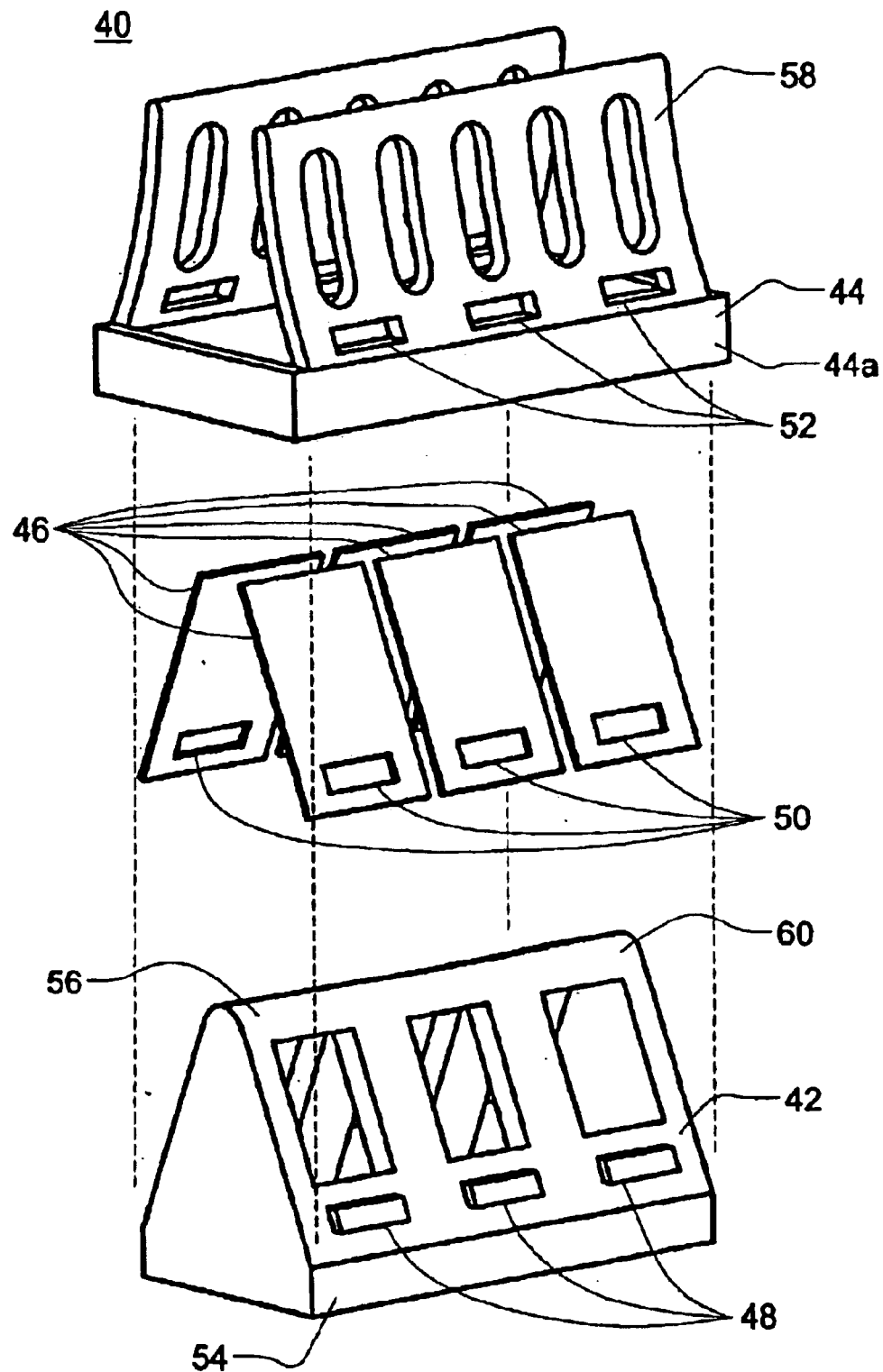
FIG. 7 is an exploded view of the embodiment of the invention depicted in FIG. 3.
Figure 8:
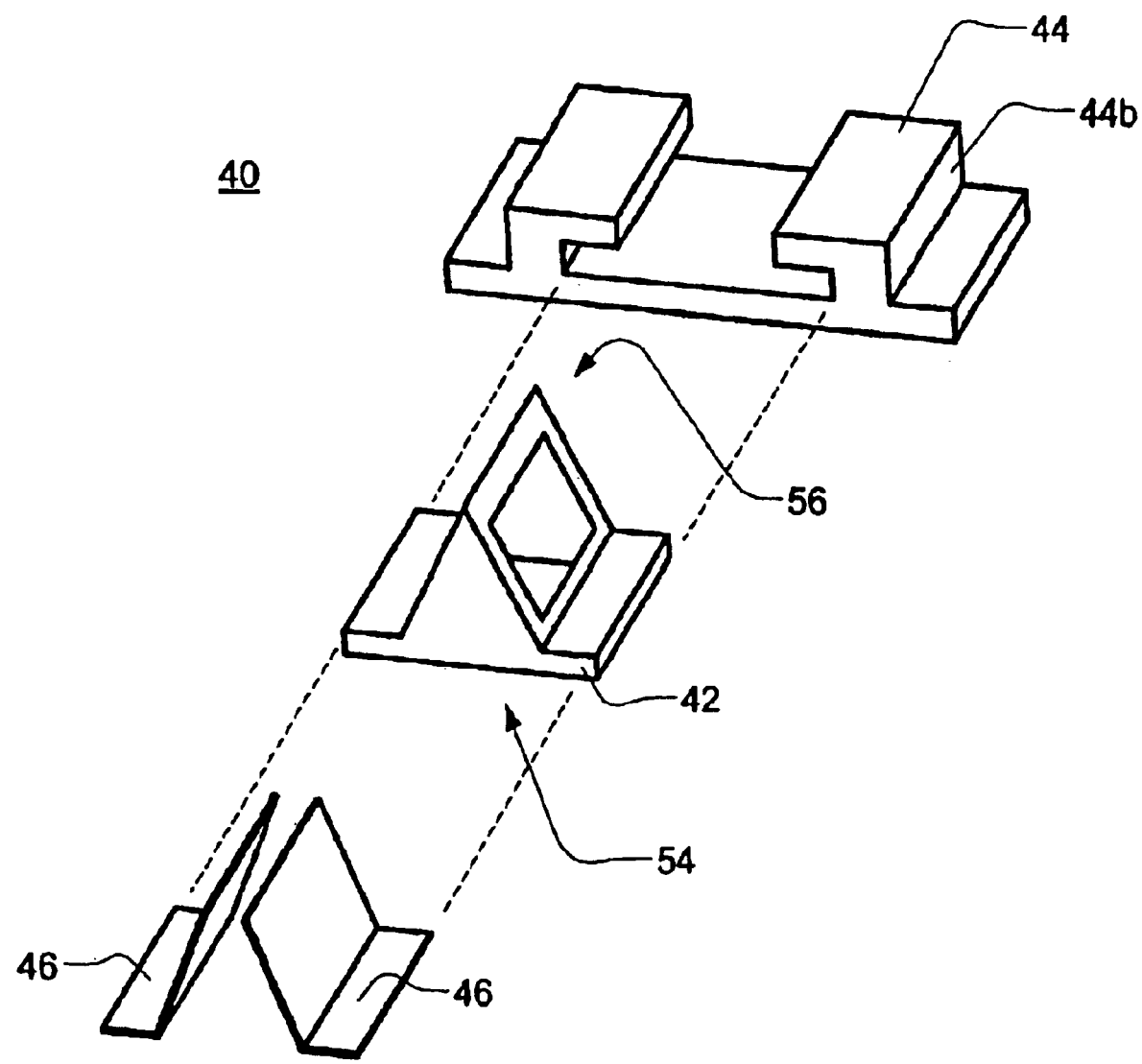
FIG. 8 is an exploded view of the embodiment of the invention depicted in FIG. 6.

Another embodiment of the retainer 44 is a slotted receiver 44b, as shown in FIG. 6. The slotted receiver 44b is normally built into the engine, motor or machine in which the reed valve assembly 40 is to be used. With the reed petals 46 fitted on the reed cage 42, the reed cage 42 slides firmly into the slotted receiver 44b. By designing the reed petals 46 to extend beneath within the slotted receiver 44b, the slotted receiver 44b secures the reed petals 46 to the reed cage 42.

We claim:

1. A reed valve assembly comprising:
   a reed cage;
   a plurality of reed petals removably secured to the reed cage; and
   a retainer independently interlockable with the reed cage and the plurality of reed petals without the use of a tool.

2. The reed valve assembly of claim 1 wherein at least one of the reed petals is secured to the reed cage with the retainer.

3. The reed valve assembly of claim 1 wherein the reed cage is w-shaped.

4. The reed valve assembly of claim 1 wherein the reed petals are secured at differing heights.

5. The reed valve assembly of claim 1 wherein the reed cage further comprises at least one airfoil tip, thereby improving the aerodynamics of the assembly.

6. The reed valve assembly of claim 1 wherein the retainer further comprises at least one reed stop.

7. The reed valve assembly of claim 1 wherein the plurality of reed petals comprises:
   a plurality of inner reed petals removably secured to the reed cage by an insert; and
   a plurality of outer reed petals removably secured to the reed cage with the retainer.

8. The reed valve assembly of claim 7 wherein a top of the inner reed petals is located above a top of the outer reed petals.

9. The reed valve assembly of claim 1 wherein the retainer is manually interlockable with the reed cage thereby avoiding the need for tools when assembling.

10. The reed valve assembly of claim 1 wherein the retainer is a flange.

11. The reed valve assembly of claim 1 wherein the retainer is a slotted receiver.

12. A reed valve assembly comprising:
    a reed cage;
    a retainer independently interlockable with the reed cage; and
    a plurality of reed petals removably secured to the reed cage, said plurality of reed petals comprising:
    a plurality of inner reed petals removably secured to the reed cage by an insert; and
    a plurality of outer reed petals removably secured to the reed cage with the retainer.

13. The reed valve assembly of claim 12 wherein a top of the inner reed petals is located above a top of the outer reed petals.

14. A reed valve assembly comprising:
    a reed cage;
    a retainer independently interlockable with the reed cage wherein said retainer is manually interlockable with the reed cage thereby avoiding the need for tools when assembling; and
    a plurality of reed petals removably secured to the reed cage by the retainer.

* * * * *